May 16, 1967  H. FALDER  3,320,403
REMOTE CONTROL SYSTEM FOR INFLUENCING ADJUSTABLE ELEMENTS
AND FOR PRODUCING REMOTE CONTROLLED HEATING
Filed July 10, 1964
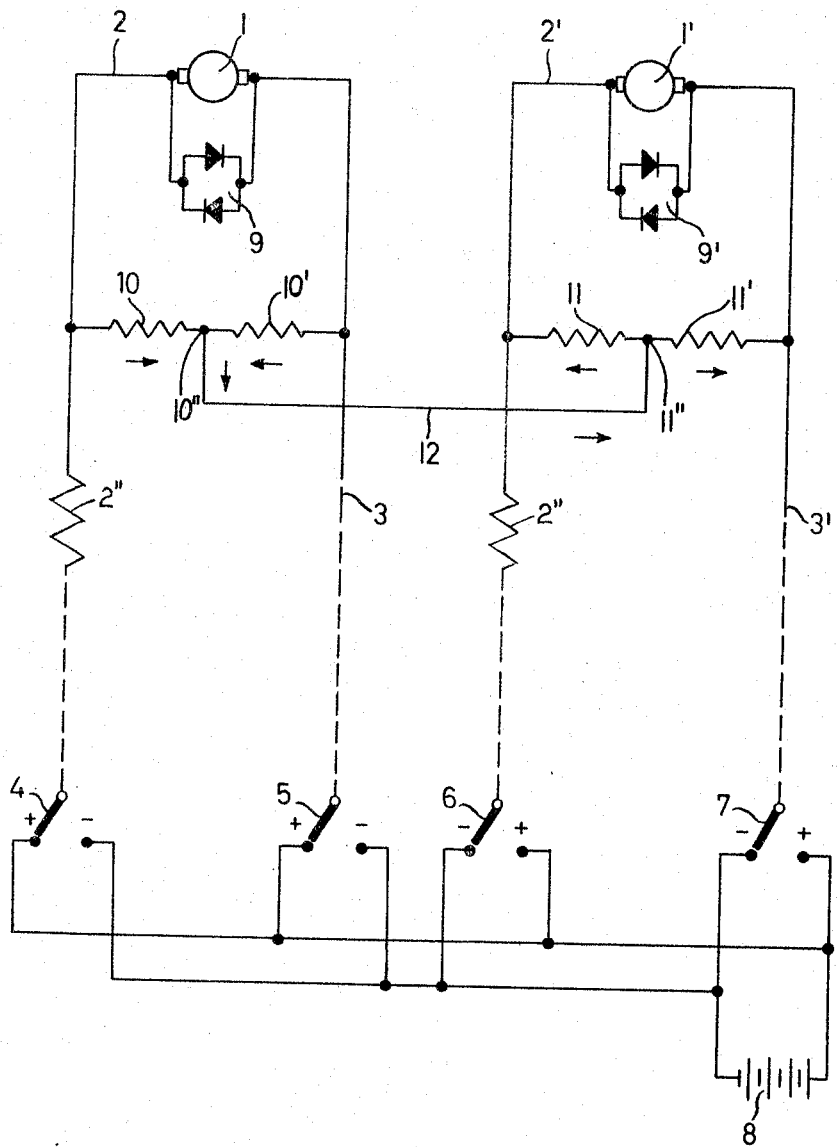
Inventor
Heinrich Falder
by
Michael J. Striker United States Patent Office 3,320,403
Patented May 16, 1967

3,320,403
REMOTE CONTROL SYSTEM FOR INFLUENCING ADJUSTABLE ELEMENTS AND FOR PRODUCING REMOTE CONTROLLED HEATING
Heinrich Falder, Allersberg, Germany, assignor to Max Grundig, Furth, Germany
Filed July 10, 1964, Ser. No. 381,766
Claims priority, application Germany, Oct. 25, 1963, G 39,033
4 Claims. (Cl. 219—209)

The present invention concerns a direct current operated remote control system, and more specifically a remote control system for electrically influencing or adjusting adjustable elements and for producing remote controlled heating, particularly in connection with precision mechanisms which are settable to desired positions by means of remote controlled direct current motors.

It is customary to use for the adjustment of settable precision mechanisms e.g. objectives or swivel heads of photographic or television cameras, direct current motors having as small a size as possible, yet high output efficiency, and which have a comparatively low armature resistance and are constructed for being operated at low voltage. In many cases these motors are controlled from a remote control panel or the like which is located at a comparatively great distance from the members or mechanisms to be remote controlled. It can easily occur that the control connections or leads from the control panel to the motor to be remote controlled have a length of several hundred yards so that the resistance in the control leads may be of the order of 100 ohms. Consequently, such a resistance in the control leads would constitute a series resistance for the motors so that with increasing load a very substantial drop of voltage at the terminals of the motor and consequently also a reduction of the rotary speed of the particular motor would result. This, however, would entail a change in the speed of the effected adjustment of the respective precision mechanism or settable element. It has been found, that this disadvantage is particularly noticeable if the remote controlled members are subject to considerable variations of the ambient temperature e.g. in those cases where the remote controlled elements are located outdoors. At comparatively low temperatures the movability of such mechanisms or of gears operated thereby decreases very much, and, on the other hand, at comparatively high temperatures the resulting increased movability of these parts or elements may lead to an increase of the rotary speed of the remote controlled motors so that among other disadvantages even the service life of these motors may be substantially reduced.

In order to prevent an undesired increase of the motor speed on account of increased movability of the precision mechanisms or settable elements and in order also to prevent a reduction of the motor speed on account of a drop of the voltage at the motor terminals upon increased load, it is necessary and desirable to keep the voltage at the motor terminals constant irrespective of the length of the control cables or leads and of the resulting series resistance appearing in the supply circuit of the motor.

On the other hand, it has been found that a decrease of the movability of the precision mechanisms or settable elements as well as that of other members to be moved in connection with the remote control can be avoided if low ambient temperatures are compensated by raising the temperature of these elements and mechanisms. It would not entail difficulties if comparatively small electric heating elements or resistors are to be structurally combined with the movable parts, but it is rather inconvenient to provide for such heating resistors a suitable current supply because ordinarily this would mean that extra leads or cables have to be provided for connecting the sometimes far remote source of energy with the respective heating resistors. This is particularly inconvenient because in most cases it is not possible to make available in a normal cable connection additional leads, let alone the additional cost for such additional connections of a length of several hundred yards.

It is, therefore, one object of the present invention to provide in a remote control system means for carrying out the remote control of direct current motors and also the supply of electric energy to respectively associated heating resistor elements by means of a comparatively simple circuit system which does not require extra leads for the heating elements.

It is another object of this invention to provide for an arrangement of the type set forth which is comparatively simple in its structure and entirely reliable in operation.

The sole figure is a schematic showing of the invention.

With the above objects in view the invention includes, in a direct current operated remote control system for influencing adjustable elements and for producing remote controlled heating, in combination, a source of direct current having a positive and a negative terminal; at least two direct current motors each having a first and a second terminal; circuit means including a plurality of motor energizing leads respectively connecting said motor terminals with said source and including switch means movable between a first position in which each of said motors has both its terminals simultaneously connected with a selected one of said terminals of said source whereby both said motors are caused to be at a standstill, and a second position in which each of said motors has each of its terminals connected respectively to different terminals of said source whereby both said motors are energized; and at least two heating resistor means, each being connected in parallel with a different one of said motors and each of said resistor means being composed of two halves in series-connection and joined with each other at a central junction point therebetween, said junction point of said two resistor means being connected with each other so that both said heating resistor means are energized through said motor energizing leads when said switch means are in said first position thereof and said motors are at a standstill, provided that both said terminals of one of said motors are connected to said positive terminal of said source and both said terminals of the other motor are connected with said negative terminal of said source.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawing in which one embodiment of the invention is illustrated by way of example in the form of a schematic circuit diagram.

Referring to the drawing, it can be seen that two direct current motors 1 and 1' are each connected by a pair of energizing leads 2, 3 and 2', 3', respectively, with a source of direct current voltage 8. Inserted in these leads are change-over switches 4, 5, 6 and 7, respectively, in the arrangement as illustrated. Each of these switches has two stationary contacts one of which is connected with the negative terminal of the source of battery 8 while the other stationary contact is connected with the positive terminal thereof. Each of the motors 1 and 1' has connected therewith in parallel i.e. between the motor terminals a shunt circuit 9, 9', respectively, each of these shunt circuits comprising preferably two diodes in bipolar or antiparallel arrangement. It is to be understood that these diodes, or the combination thereof, have a properly selected characteristic in relation to the operative voltage to be applied to the respectively associated motor so that in a well known manner the potential appearing at the motor terminals is kept at a substantially constant value irrespective of an occurring voltage drop along the energizing leads 2, 3, 2' and 3', respectively. Moreover, it can be seen that heating resistors are connected in parallel with the individual motors 1 and 1'. Connected in parallel with the motor 1 is a series-combination of resistors 10 and 10' connected with each other at a central junction point 10''. Similarly, connected in parallel with the other motor 1' is a series-combination of resistors 11 and 11' being connected with each other at a central junction point 11''. The two junction points 10'' and 11'' are connected with each other by a connecting line 12. Of course, instead of using two separate heating resistors connected in series in each of the above-mentioned cases, a single heating resistor may be used which has a central tap at the place of the junction points 10'' and 11''. In any case, it is desirable that the halves 10 and 10' are equal to each other and similarly the halves 11 and 11' are equal to each other.

Part of the above arrangement is similar to a known circuit arrangement for stabilizing the voltage applied to a load and comprising a series-resistance and a voltage-dependent resistance connected in parallel with the load. However, in the arrangement according to the invention the above-mentioned series-resistance is ordinarily constituted by the actual internal resistance of the connecting cables 2, 3, 2' and 3'. Evidently, upon an increase of the voltage across the terminals of either one of the motors a correspondingly strong increasing current will flow through the respective diodes of the shunt circuits 9, 9', respectively. Consequently, the voltage drop along the resistance constituted by the respective cable will increase, with the result that a substantially constant predetermined voltage will appear at the terminals of the motor or motors. The diodes in the shunt circuits 9, 9' must be chosen so that they serve to stabilize the voltage at the motor terminals to said predetermined value in cooperation with the cable resistance acting as a series-resistance. However, in the case where the cables should have an exceptionally short length and consequently a low resistance it may be advisable or necessary to insert into at least one of the cable connections an auxiliary series-resistance 2'' as shown in the drawing.

In practice, it will be advantageous to select diodes which are matched in the above-mentioned sense with a series-resistance of about 100 ohms. As stated at the outset, the resistance in the control leads or cables may be of the order of 100 ohms. This can be expected to be the case as a rule because the entire arrangement is intended to constitute a remote control system in which case the connections between the control means and the motors to be controlled may easily reach a length of one hundred or several hundred yards. It is evident that as a rule under these circumstances the actual resistance of the cable or cables will be sufficient for the above purpose.

The operation of the arrangement as illustrated is as follows: When it is desired to cause both motors 1 and 1' to be at a standstill then all the switches 4, 5, 6, 7 are to be in such a position, that in the case of each motor the motor terminals are simultaneously connected to one selected terminal of the battery 8 so that an energization of the particular motor is impossible. In the illustrated example both switches 6 and 7 are connected with the negative terminal of the battery 8 while the switches 4 and 5 are connected with the positive terminal of the battery 8. Of course, standstill of e.g. the motor 1' would be caused also if both switches 6 and 7 were connected with the positive terminal of the battery 8. However, it can be seen readily if both terminals of motor 1 are connected with one terminal e.g. the positive terminal of battery 8, while both terminals of the motor 1' are connected with the other e.g. the negative terminal of the battery 8, then, while the motors 1 and 1' are kept at standstill, the energy furnished by the battery 8 will be used exclusively for the purpose of producing remote controlled heat because in this case the current from the positive terminal battery 8 will flow over the switches 4 and 5 into the resistor portions 10 and 10' as indicated by the arrows and from the central junction point 10'' through line 12 to the junction point 11'', and from there again as indicated by the arrows, through the resistor portions 11 and 11' back to the switches 6 and 7 and thus to the negative terminal of the battery 8.

It can be seen that by suitable operation of the switches 4–7 three different effects can be produced, namely, first, both motors can be caused to stand still without simultaneously causing the production of heat, second, both motors may be caused to stand still while simultaneously heating is produced, and third, both motors may be caused to be energized while simultaneously no heat is produced.

The last-mentioned effect can be obtained by arranging matters so that the combined resistance of the individual motor and of the respectively associated shunt circuit is so much smaller than the overall resistance of the respectively associated heating resistors that during the operation of the respective motor practically no heating current will flow through that respectively associated resistor. Of course, it is necessary that the heating circuit is symmetrical relative to the two motor circuits. It can be seen further from the drawing that the arrangement comprises motors which, as mostly required in remote control system, may rotate in one or the other direction depending upon the polarity of the voltage applied to their terminals. Thus, e.g. motor 1 will rotate in one direciton if switch 4 is connected with positive terminal and switch 5 is connected with a negative terminal of battery 8. However the motor 1 will rotate in the opposite direction if switch 5 is connected with the positive and switch 4 is connected with the negative terminal. The same applies analogously to motor 1' and switches 6 and 7. Consequently, various combinations of switch positions are available so as to effect either rotaion of both motors in the same direction, or in respectively opposite directions, in addition the direction of rotation being selectable for either one of the two motors. It is to be understood that of course a simplified arrangement is imaginable if it is only intended to cause rotation of each of the motors in one predetermined direction. In this case for each motor only one switch would be necessary. Also in this case each of the shunt circuits 9 and 9' would have to contain only one diode instead of a pair of diodes in antiparallel arrangement.

As mentioned above the shunt circuits including diodes of a predetermined characteristic have the desirable effect that the voltage and consequently the speed of rotation of the motor remains practically constant which effect is assisted by the heating produced by the respective heating resistor so that the movability of the elements to be driven by the remote controlled motor remains practically constant in spite of possibly low ambient temperatures.

An additional advantage resulting from the use of the diodes in the shunt circuits 9 and 9' is that irregular voltages or pulsations caused by the collectors of the motors 1 and 1' are very considerably damped thereby which is favorable for a smooth operation and for avoiding other disturbances in the neighborhood.

In any case, it can be seen that the arrangement according to the invention entails the advantage that the rotary speed of the remote controlled motors is kept constant in spite of possibly very long current supply leads or cables irrespective of the torque to be produced by the particular motor, and that in addition the heating of the movable elements which does not require separate heating current supply leads removes the reduction of movability of the remote controlled precision mechanisms or settable elements e.g. on account of lubricants becoming very viscous. This additional heating by remote control is advantageous even for a further reason because also other elements which are not directly part of the remote controlled mechanism e.g. windows, lenses or the like are also heated so as to be protected against fogging.

It will be understood that each of the elements described above, or two or more together, may also find a useful application in other types of a remote control system for influencing adjustable elements and for producing remote controlled heating differing from the types described above.

While the invention has been illustrated and described as embodied in a direct current operated remote control system for influencing adjustable elements and for producing remote controlled heating, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be secured by Letters Patent is:

1. In a direct current operated remote control system for influencing adjustable elements and for producing remote controlled heating, in combination, a source of direct current having a positive and a negative terminal; at least two direct current motors each having a first and a second terminal; circuit means including a plurality of motor energizing leads respectively connecting said motor terminals with said source and including switch means movable between a first position in which each of said motors has both its terminals simultaneously connected with a selected one of said terminals of said source whereby both said motors are caused to be at a standstill, and a second position in which each of said motors has each of its terminals connected respectively to different terminals of said source whereby both said motors are energized; and at least two heating resistor means, each being connected in parallel with a different one of said motors and each of said resistor means being composed of two halves in series-connection and joined with each other at a central junction point therebetween, said junction points of said two resistor means being connected with each other so that both said heating resistor means are energized through said motor energizing leads when said switch means are in said first position thereof and said motors are at a standstill, provided that both said terminals of one of said motors are connected to said positive terminal of said source and both said terminals of the other motor are connected with said negative terminal of said source.

2. In a direct current operated remote control system for influencing adjustable elements and for producing remote controlled heating, in combination, a source of direct current having a positive and a negative terminal; at least two direct current motors each having a first and a second terminal and being operable in one and the opposite direction depending upon the polarity of electric energy applied to said terminals; circuit means including a plurality of motor energizing leads respectively connecting said motor terminals with said source and including a plurality of switch means arranged respectively in said energizing leads and each being movable to a first position in which each of said motors has both its terminals simultaneously connected with a selected one of said terminals of said source whereby both said motors are caused to be at a standstill, and to a second position in which each of said motors has each of its terminals connected respectively to different terminals of said source whereby both said motors are energized; and at least two heating resistor means, each being connected in parallel with a different one of said motors and each of said resistor means being composed of two halves in series-connection and joined with each other at a central junction point therebetween, said junction points of said two resistor means being connected with each other so that both said heating resistor means are energized through said motor energizing leads when said switch means are in said first position thereof and said motors are at a standstill, provided that both said terminals of one of said motors are connected to said positive terminal of said source and both said terminals of the other motor are connected with said negative terminal of said source.

3. In a direct current operated remote control system for influencing adjustable elements and for producing remote controlled heating, in combination, a source of direct current having a positive and a negative terminal; at least two direct current motors each having a first and a second terminal; circuit means including a plurality of motor energizing leads respectively connecting said motor terminals with said source and including switch means movable between a first position in which each of said motors has both its terminals simultaneously connected with a selected one of said terminals of said source whereby both said motors are caused to be at a standstill, and a second position in which each of said motors has each of its terminals connected respectively to different terminals of said source whereby both said motors are energized, said circuit means further including for each of said motors a shunt circuit, respectively, connected between said terminals of the particular motor, said shunt circuit comprising at least one diode means having a characteristic selected for keeping the voltage at said terminals of the particular motor substantially constant, the combined resistance of the particular motor and of said shunt circuit being so much smaller than that of a heating resistor means connected in parallel with the particular motor that said heating resistor means remain substantially unenergized while the particular motor is energized; and there being at least two of said heating resistor means, each being connected in parallel with a different one of said motors and each of said resistor means being composed of two halves in series-connection and joined with each other at a central junction point therebetween, said junction points of said two resistor means being connected with each other so that both said heating resistor means are energized through said motor energizing leads when said switch means are in said first position thereof and said motors are at a standstill, provided that both said terminals of one of said motors are connected to said positive terminal of said source and both said terminals of the other motor are connected with said negative terminal of said source.

4. In a direct current operated remote control system for influencing adjustable elements and for producing remote controlled heating, in combination, a source of direct current having a positive and a negative terminal; at least two direct current motors each having a first and a second terminal and being operable in one and the opposite direction depending upon the polarity of electric energy applied to said terminals; circuit means including a plurality of motor energizing leads respectively connecting said motor terminals with said source and including a plurality of switch means arranged respectively in said energizing leads and each being movable to a first position in which each of said motors has both its terminals simultaneously connected with a selected one of said terminals of said source whereby both said motors are caused to be at a standstill, and to a second position in which each of said motors has each of its terminals connected respectively to different terminals of said source whereby both said motors are energized, said circuit means further including for each of said motors a shunt circuit, respectively, connected between said terminals of the particular motor, said shunt circuit comprising bipolar diode means including at least two diodes in antiparallel arrangement and having a characteristic selected for keeping the voltage at said terminals of the particular motor substantially constant, the combined resistance of the particular motor and of said shunt circuit being so much smaller than that of a heating resistor means connected in parallel with the particular motor that said heating resistor means remain substantially unenergized while the particular motor is energized; and there being at least two of said heating resistor means, each being connected in parallel with a different one of said motors and each of said resistor means being composed of two halves in series-connection and joined with each other at a central junction point therebetween, said junction points of said two resistor means being connected with each other so that both said heating resistor means are energized through said motor energizing leads when said switch means are in said first position thereof and said motors are at a standstill, provided that both said terminals of one of said motors are connected to said positive terminal of said source and both said terminals of the other motor are connected with said negative terminal of said source.

References Cited by the Examiner

UNITED STATES PATENTS

| | | | |
|---|---|---|---|
| 2,240,207 | 4/1941 | Crawford | 318—558 |
| 2,338,518 | 1/1944 | Koch | 318—558 |
| 2,512,342 | 6/1950 | Larkin | 318—558 |

RICHARD M. WOOD, *Primary Examiner.*

C. L. ALBRITTON, *Assistant Examiner.*